United States Patent
Morishita et al.

(10) Patent No.: US 7,355,306 B2
(45) Date of Patent: Apr. 8, 2008

(54) MOTOR DRIVEN BLOWER SUPPORT SYSTEM

(75) Inventors: Yusuke Morishita, Kuwana (JP); Akihiro Hayakawa, Iwakura (JP); Yoshimitsu Inoue, Chiryu (JP); Eiji Hirachi, Ueda (JP)

(73) Assignees: DENSO Corporation, Kariya (JP); Shinano Kenshi Kabushiki Kaisha, Nagano (JP)

( * ) Notice: Subject to any disclaimer, the term of this patent is extended or adjusted under 35 U.S.C. 154(b) by 0 days.

(21) Appl. No.: 11/657,736

(22) Filed: Jan. 24, 2007

(65) Prior Publication Data

US 2007/0170790 A1     Jul. 26, 2007

(30) Foreign Application Priority Data

Jan. 25, 2006  (JP) .............................. 2006-016252

(51) Int. Cl.
H02K 5/24    (2006.01)

(52) U.S. Cl. ......................................... 310/51; 310/91

(58) Field of Classification Search .................. 310/51, 310/91
See application file for complete search history.

(56) References Cited

U.S. PATENT DOCUMENTS

| 3,546,504 | A | * | 12/1970 | Bottle et al. ................... 310/51 |
| 5,149,213 | A | * | 9/1992 | Yoshida et al. ........ 400/124.22 |
| 5,172,023 | A | * | 12/1992 | Kawai et al. .......... 310/323.04 |
| 6,563,239 | B1 | * | 5/2003 | Baer et al. ..................... 310/51 |
| 2004/0163398 | A1 | | 8/2004 | Morishita et al. |

FOREIGN PATENT DOCUMENTS

JP        2004-255960       9/2004

* cited by examiner

*Primary Examiner*—Darren Schuberg
*Assistant Examiner*—Hong-Vinh Nguyen
(74) *Attorney, Agent, or Firm*—Harness, Dickey & Pierce, PLC

(57) ABSTRACT

A drive motor is supported and fixed onto a motor support plate composing a support member through vibration proof rubber which damps vibration, the frequency of which is not less than 1 kHz. Due to the foregoing, it becomes difficult for the vibration generated from the drive motor itself, to be transmitted to the support member so that the generation of resonance noise can be prevented.

4 Claims, 6 Drawing Sheets

MOTOR DRIVEN BLOWER SUPPORT SYSTEM

BACKGROUND OF THE INVENTION

1. Technical Field of the Invention

The present invention relates to a blower for sending air. More particularly, the present invention relates to a blower used for a cooling device which cools an object to be cooled to a temperature not more than a predetermined temperature when a volume of air to be blown out is changed according to a quantity of heat generated by the object to be cooled.

2. Description of the Related Art

A battery cooling device disclosed in the official gazette of JP-A-2004-255960 is provided with a blower for sending air for cooling a battery which supplies electric power to a motor used for running. This blower includes a blowing fan and a drive motor. When the rotating speed of the drive motor is changed, the volume of air blown out from the blowing fan is adjusted, so that a temperature of the battery can be maintained at a temperature not more than a predetermined temperature.

In this connection, in the case of a blower, the rotating speed of the drive motor of which is changed like the drive motor of the battery cooling device disclosed in the official gazette of JP-A-2004-255960, the frequency of the magnetic vibration of the drive motor is changed according to the rotating speed. This magnetic vibration is caused by a periodic change in a magnetic force generated by a stator coil arranged in the drive motor. By this magnetic vibration, the drive motor itself is vibrated. Accordingly, when the frequency of the magnetic vibration is changed, the vibration frequency of the drive motor itself is also changed.

Vibration of the drive motor itself is transmitted to a support member such as a motor support plate, a casing and so forth for supporting and fixing the drive motor. Therefore, when the vibration frequency of the drive motor itself changes and coincides with a resonance frequency of the support member, the support member resonates and a resonance noise is generated.

SUMMARY OF THE INVENTION

In view of the above points, it is a first object of the present invention to prevent generation of resonance noise from a support member even when a rotating speed of a drive motor is changed.

Further, it is a second object of the present invention to prevent generation of resonance noise from a support member and other members, to which vibration of a drive motor itself is transmitted, even when a rotating speed of a drive motor is changed.

The present invention has been devised in order to accomplish the above objects. A first embodiment of the present invention provides a blower comprising: a movable member (41) including a sending air member (41a) for sending air; a drive motor (42) for driving the movable member (41); and a support member (43, 44) for supporting the drive motor (42), wherein the drive motor (42) is supported by the support member (43, 44) via a damping member (45) for damping vibration, the frequency of which is not less than a predetermined frequency (f), and a resonance frequency of the support member (43, 44) is not less than the predetermined frequency (f).

Due to the above constitution, the drive motor (42) is supported by the support member (43, 44) through the damping member (45) for damping vibration, the frequency of which is not less than a predetermined frequency (f). Therefore, vibrational components in the vibration, which is generated by the drive motor (42) itself, are seldom transmitted to the support member (43). Accordingly, the support member (43, 44) seldom resonates at frequencies not less than the predetermined frequency (f).

As the resonance frequency of the support member (43, 44) is not less than the predetermined frequency (f), even when vibration of the drive motor (42) itself, the frequency of which is lower than the predetermined frequency (f), is transmitted to the support member (43, 44), the support member (43, 44) does not resonate.

Accordingly, even when the rotating speed of the drive motor (42) is changed and the vibrational frequency of the drive motor (42) itself is changed, the support member (43, 44) does not resonate. Therefore, it is possible to prevent the generation of resonance noise of the support member (43, 44).

In the present invention, the phrase "damping of vibration" means that a force (Ps.) transmitted to the support member (44) by the exciting force (Fm), which is generated by the drive motor (42), is lower than the exciting force (Pm) of the drive motor (42).

"The support member" described in the present invention is a component for directly supporting the drive motor (42) through the damping member (45). Further, "the support member" described in the present invention is a component connected to the component for directly supporting the drive motor (42). Accordingly, vibration of the drive motor (42) is transmitted to the component composing "the support member" through the damping member (45).

To be specific, for example, as shown in the embodiment described later, "the support member" includes: a motor support plate (44) for directly supporting the drive motor (42) through the damping member (45); and a scroll casing (43) connected to the motor support plate (44).

In the blower of the above first embodiment, the damping member is specifically made of vibration proof rubber (45). Due to this constitution, since a shape of the vibration proof rubber (45) can be easily changed and a material of the vibration proof rubber (45) can be easily selected, it is easy to compose a damping member for damping the vibration, the frequency of which is not less than a predetermined frequency (f).

Specifically, the vibration proof rubber (45) may be made of butyl rubber. The vibration damping effect of butyl rubber is high. Accordingly, the vibration, the frequency of which is not less than the predetermined frequency (f), can be effectively damped. As a result, it becomes more difficult for the vibrational components, the frequency of which is not less than the predetermined frequency (f), to be transmitted to the support member (44). Accordingly, the generation of resonance noise of the support member (44) can be effectively prevented.

In the blower described above, the support member (43, 44) may include a resonance frequency adjustment is section (44a) for adjusting a resonance frequency of the support member (43, 44). Due to the above constitution, even when only the resonance frequency adjustment section (44a) is formed in the support member (43, 44), the resonance frequency can be easily adjusted.

Specifically, the support member (43, 44) includes a motor support plate (44) to which the drive motor (42) is attached, and the resonance frequency adjustment section may be a protruding portion (44a) formed on a surface of the motor support plate (44).

Due to the above constitution, when only a shape, an arrangement position and a protrusion of the protruding portion (44a) are adjusted, the resonance frequency of the entire support member can be easily adjusted. Further, as only the protruding portion (44a) is formed, even when the design of the existing motor support plate (44) is not greatly changed, the resonance frequency can be adjusted.

In the above blower, the drive motor (42) may include a resonance frequency adjustment section For adjusting a resonance frequency of the drive motor (42). Further, the movable member (41) may include a resonance frequency adjustment section for adjusting a resonance frequency of the movable member (41).

Due to the foregoing, the resonance frequency of the drive motor (42) can be previously adjusted so that the resonance frequency of the drive motor (42) can not coincide with the vibrational frequency of the drive motor (42) itself which is in a state of operation. As a result, even when the rotating speed of the drive motor (42) is changed and the vibrational frequency of the drive motor (42) itself is changed, the drive motor (42) does not resonate. Accordingly, it is possible to prevent the generation of resonance noise from the drive motor (42).

In the same manner, when the resonance frequency of the movable member (41) is previously adjusted, it is possible to prevent the generation of resonance noise from the movable member (41). That is, even when the rotating speed of the drive motor (42) is changed, it is possible to prevent the generation of resonance noise of not only the support member (43, 44) but also other members to which the vibration of the drive motor (42) is transmitted.

In this connection, the adjusting portions, which are formed in the support member (43, 44), the drive motor (42) and the movable member (41), can be not only formed out of a protruding portion but also formed out of a thick portion or a portion, the material of which is changed.

In the above blower, the predetermined frequency (f) may be specifically a frequency of 1 kHz. According to the investigations made by the present inventors, the vibration proof rubber (45) is capable of easily damping the vibration, the frequency of which is not less than 1 kHz. Further, the present inventors found that the resonance point can be easily set at a point not less than 1 kHz when the support member (44) is made of metal. Accordingly, when the predetermined frequency (f) is set at 1 kHz, the above blower can be easily composed.

In this connection, reference numerals and signs in the parentheses after the means described in this section and the scope of claim of the invention correspond to the specific means described in the embodiment described later.

The present invention may be more fully understood from the description of preferred embodiments of the invention, as set forth below, together with the accompanying drawings.

DESCRIPTION OF THE PREFERRED EMBODIMENTS

First Embodiment

Figure 1:
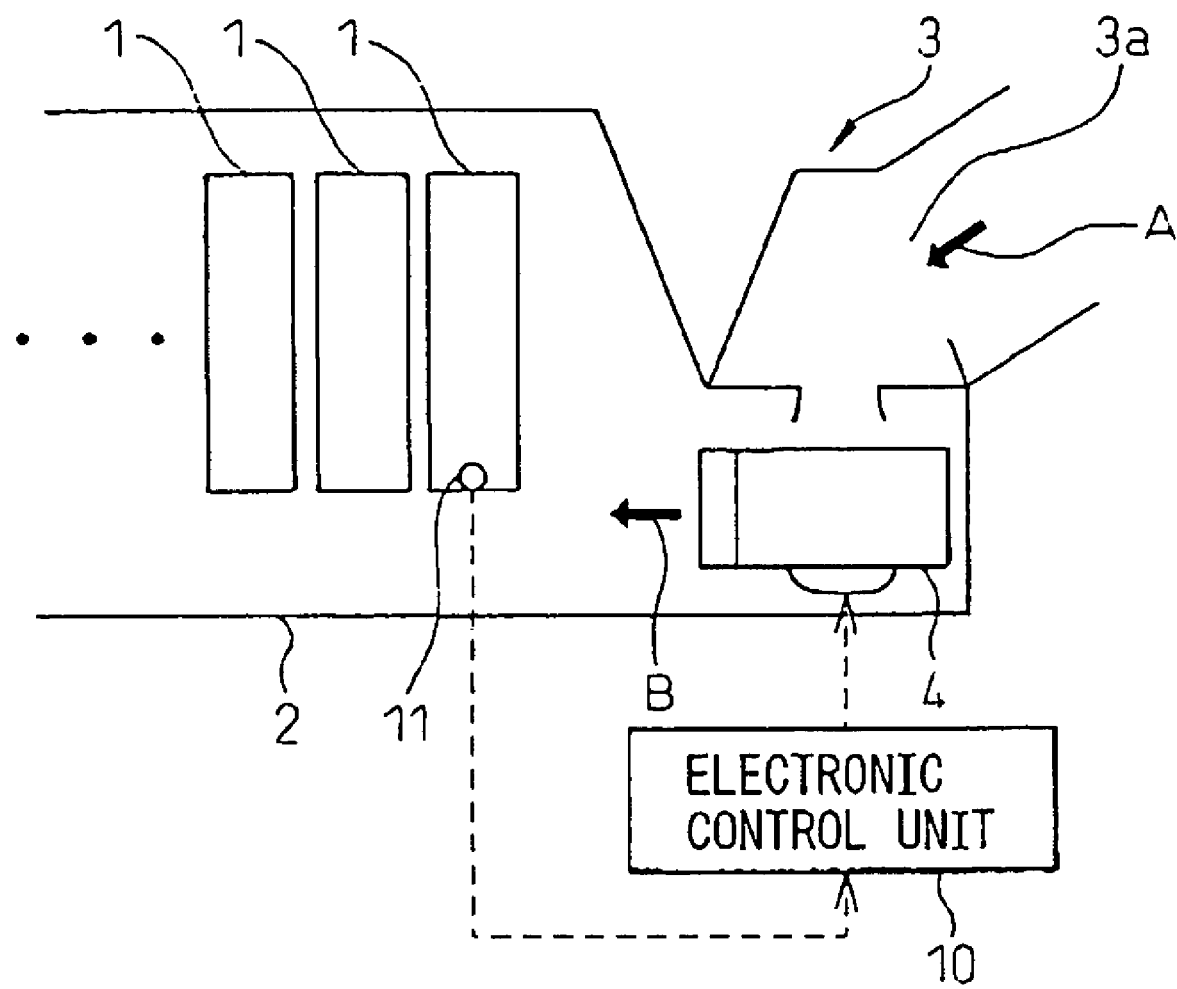
FIG. 1 is an overall arrangement view showing a battery cooling device of an embodiment of the present invention.

Referring to FIGS. 1 to 7, an embodiment of the present invention will be explained below. FIG. 1 is an overall arrangement view of an embodiment in which a blower of the present invention is applied to a battery cooling device for cooling a battery 1 mounted on a hybrid vehicle. In this connection, the hybrid vehicle is defined as a vehicle having two motive power sources used for running, wherein one is an internal combustion engine and the other is an electric motor used for running.

First of all, the battery 1 is a secondary battery capable of being electrically charged and discharged and which is mainly used for supplying electric power to the motor for running. In this embodiment, a plurality of nickel-hydrogen batteries are employed for the battery 1. These nickel-hydrogen batteries are electrically connected in serial to each other. Of course, lithium ion batteries may be employed for the battery 1.

A cooling device case 2 accommodates the battery and forms an air passage for cooling the battery. On the most upstream side of the air current of the cooling device case 2, a cooling air introducing portion 3 for introducing cooled air onto the suction side of the blower 4 described later is arranged. The cooling air introducing portion 3 has a cooling air introducing port 3a. This cooling air introducing port 3a communicates the rear seat side in a vehicle room with the cooling air introducing portion 3 so as to introduce the air (the inside air) in the vehicle room in the direction of arrow A.

On the downstream side of the air current in the cooling air introducing portion 3, an electric type blower 4 is arranged which blows air to the battery 1 in the direction of arrow B. In this embodiment, after the cooling air has cooled the battery 1, it is discharged outside the vehicle.

Figure 2:
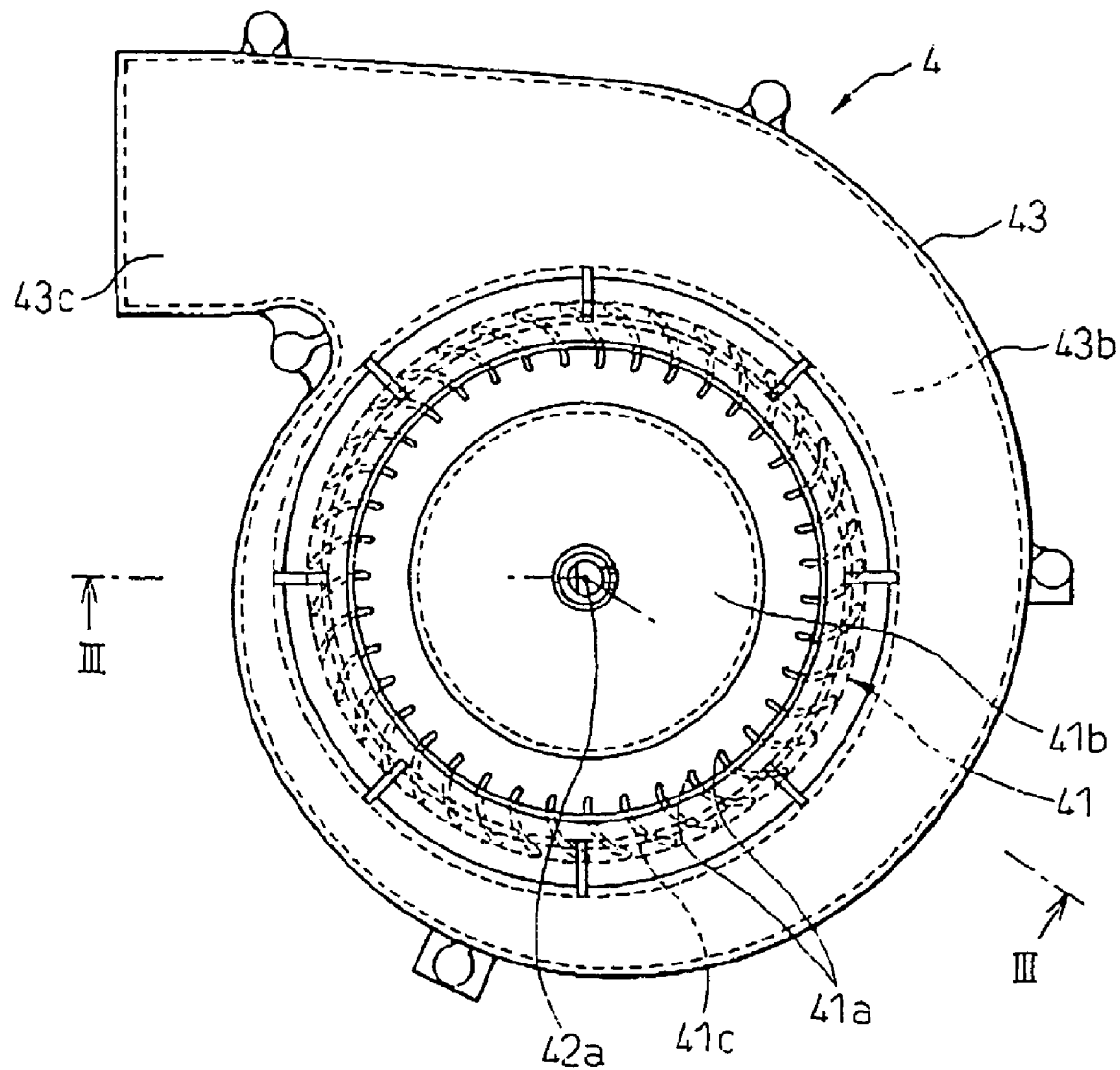
FIG. 2 is an upper view of the blower of an embodiment.
Figure 3:
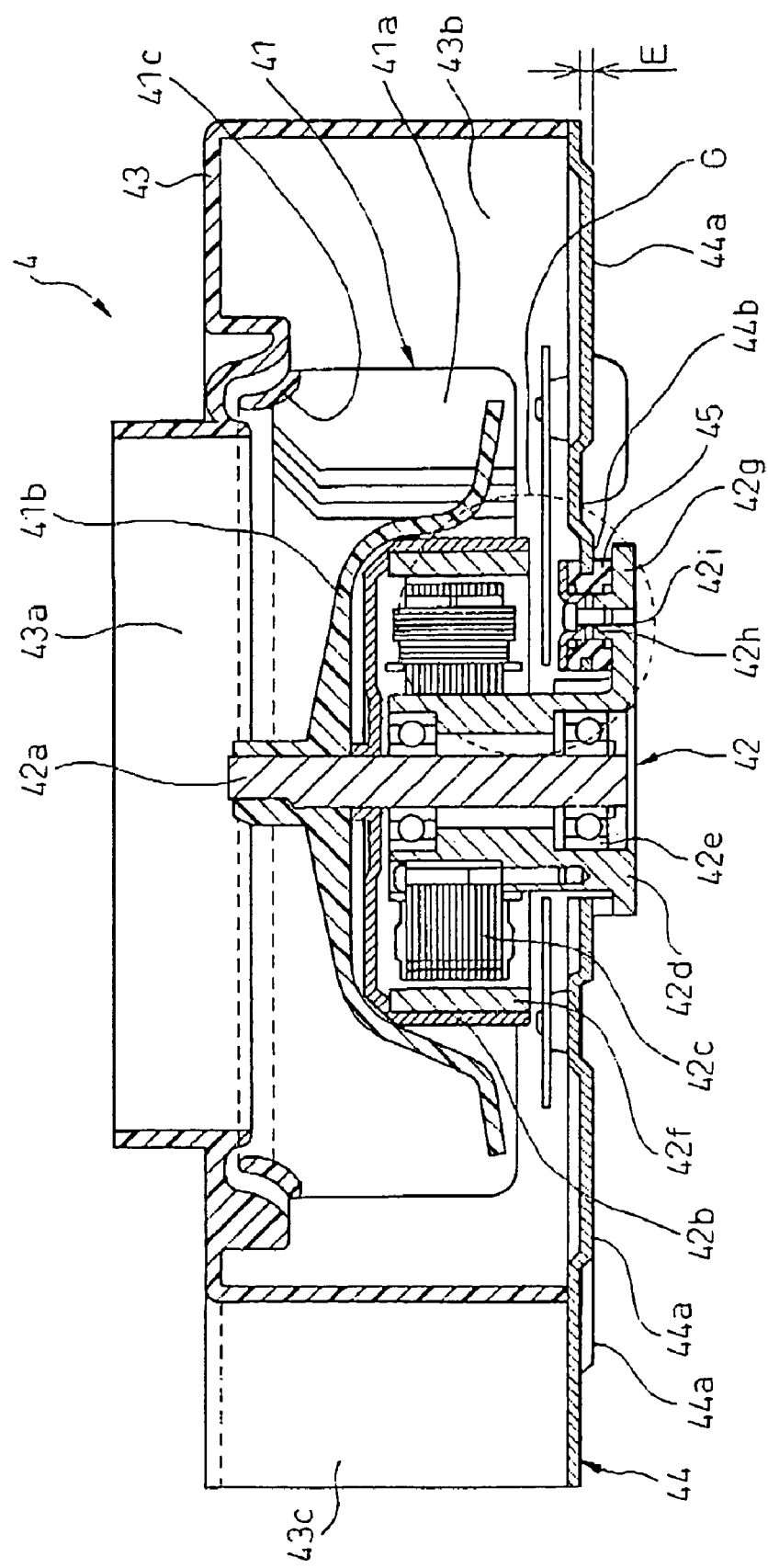
FIG. 3 is a sectional view taken on line III-III of the blower shown in FIG. 2.

Referring to FIGS. 2 and 3, this blower 4 will be explained in detail. FIG. 2 is an upper view showing the blower 4, wherein this view is taken in the direction of the rotary shaft of the blowing fan 41 described later. FIG. 3 is a sectional view taken on line III-III in FIG. 2.

The blower 4 includes: a blowing fan 41; a drive motor 42; a scroll casing 43; a motor support plate 44; and vibration proof rubber 45. The blowing fan 41 is a well-known centrifugal multiple blade fan in which a plurality of blades 41a are annularly arranged round a rotary shaft. Accordingly, in the present embodiment, the blowing fan 41 is a movable member and the blade 41a is a blowing member.

The blowing fan 41 includes a boss plate 41b and a ring 41c. The blade 41a, the boss plate 41b and the ring 41c are integrally molded out of polypropylene resin. Of course, the blade 41a, the boss plate 41b and the ring 41c may be composed differently from each other and integrated with each other into one body by means of adhesion.

At the center of the boss plate 41b, a D shape hole portion is provided which is joined to the rotary shaft 42a of the drive motor 42 described later. In an outer circumferential portion of the boss plate 41b, the boss plate 41b is engaged with a side end portion (the lower end portion of FIG. 3) of the drive motor 42 of the blade 41a. The ring 41c is joined to an end portion on the drive motor 42 side of the blade 41a and also joined to an end portion (an upper end portion of FIG. 3) on the opposite side.

Next, the drive motor 42 is an electric motor driven by the control voltage V outputted from the electronic control unit 10 described later. The drive motor 42 includes: a rotary shaft 41a; a magnet rotor 42b; a stator coil 42c; and a motor body 42d.

A forward end portion of the rotary shaft 42a is formed into a shape fitted to the D shape hole portion of the boss plate 41b. When the forward end portion of the rotary shaft 42a and the D shape hole portion of the boss plate 41b are engaged with each other, the drive motor 42 and the blowing fan 41 are connected to each other. The rotary shaft 42a is pivotally supported by the motor body 42d through the bearing 42e. Accordingly, when the rotary shaft 42a is rotated, the blowing fan 41 is rotated by being linked with the rotary shaft 42a.

A magnet rotor 42b is a substantially cylindrical rotary rotor, onto the inner wall of which a permanent magnet 42f is attached. The magnet rotor 42b is connected to the rotary shaft 42a on the blowing fan 41 attaching side (the upper side of FIG. 3) of the drive motor 42. A stator coil 42c is an exciting coil fixed to the motor body 42d. Accordingly, the drive motor 42 of the present embodiment is a so-called outer rotor type electric motor in which the magnet rotor 42b is arranged outside the stator coil 42c.

Further, the motor body 42d includes a flange 42g used for the connection with the motor support plate 44. On this flange 42g, a cylindrical protruding boss portion 42h is provided. In the boss portion 42h, screw holes 42i are provided. In this connection, in the present embodiment, three screw holes 42i are concentrically provided round the central axis of the rotary shaft 42a at an angular interval of about 120°.

A scroll casing 43 is a case made of resin. This scroll casing 43 includes: an air taking port 43a in which the blowing fan 41 is accommodated and which is used for taking air to be sucked into the blowing fan 41; an air passage 43b, which is formed into a spiral shape, in which air flowing out from the blowing fan 41 flows; and an air blowing port 43c from which air blows out.

The scroll casing 43 is arranged so that it can cover the blowing fan 41 from the opposite side to the drive motor 42 when a view is taken from the blowing fan 41 side. That is, the scroll casing 43 is arranged in such a manner that it covers the blowing fan 41 from the upper side to the lower side in FIG. 3.

The air taking port 43a is formed so that it can open onto the inner circumferential side of the ring 41c of the blowing fan 41 round the rotary shaft of the blowing fan 41. The air passage 43b is formed so that the flow passage sectional area of the air passage 43b is gradually expanded from the scroll start portion to the scroll end portion of the scroll casing 43 so as to make the air, which has been blown out from the blowing fan 41, flow onto the downstream side while the air is being effectively collected.

Further, the air blowing port 43c is arranged on the most downstream side of the air passage 43b. Accordingly, when the blowing fan 41 is rotated, the air, which has been sucked from the air taking port 43a in the rotary shaft direction, is blown out in the radial direction of the blowing fan 41 and flows in the air passage 43b and then blows out from the air blowing port 43c.

Next, the motor support plate 44 is a substantially flat metallic plate made of iron for directly supporting the drive motor 42 through the vibration proof rubber 45 described later. When viewed from the blowing fan 41 side, the motor support plate 44 is arranged so that it can support the drive motor 42 from the drive motor 42 side (the lower side of FIG. 3).

The motor support plate 44 is formed into a shape fitted to the scroll casing 43 described before. The motor support plate 44 is joined to the scroll casing 43 by a joining means such as screwing. Therefore, the vibration transmitted from the drive motor 42 is transmitted not only to the motor support plate 44 but also the scroll casing 43. Accordingly, in the present embodiment, the support member includes the motor support plate .44 and the scroll casing 43.

Figure 4:
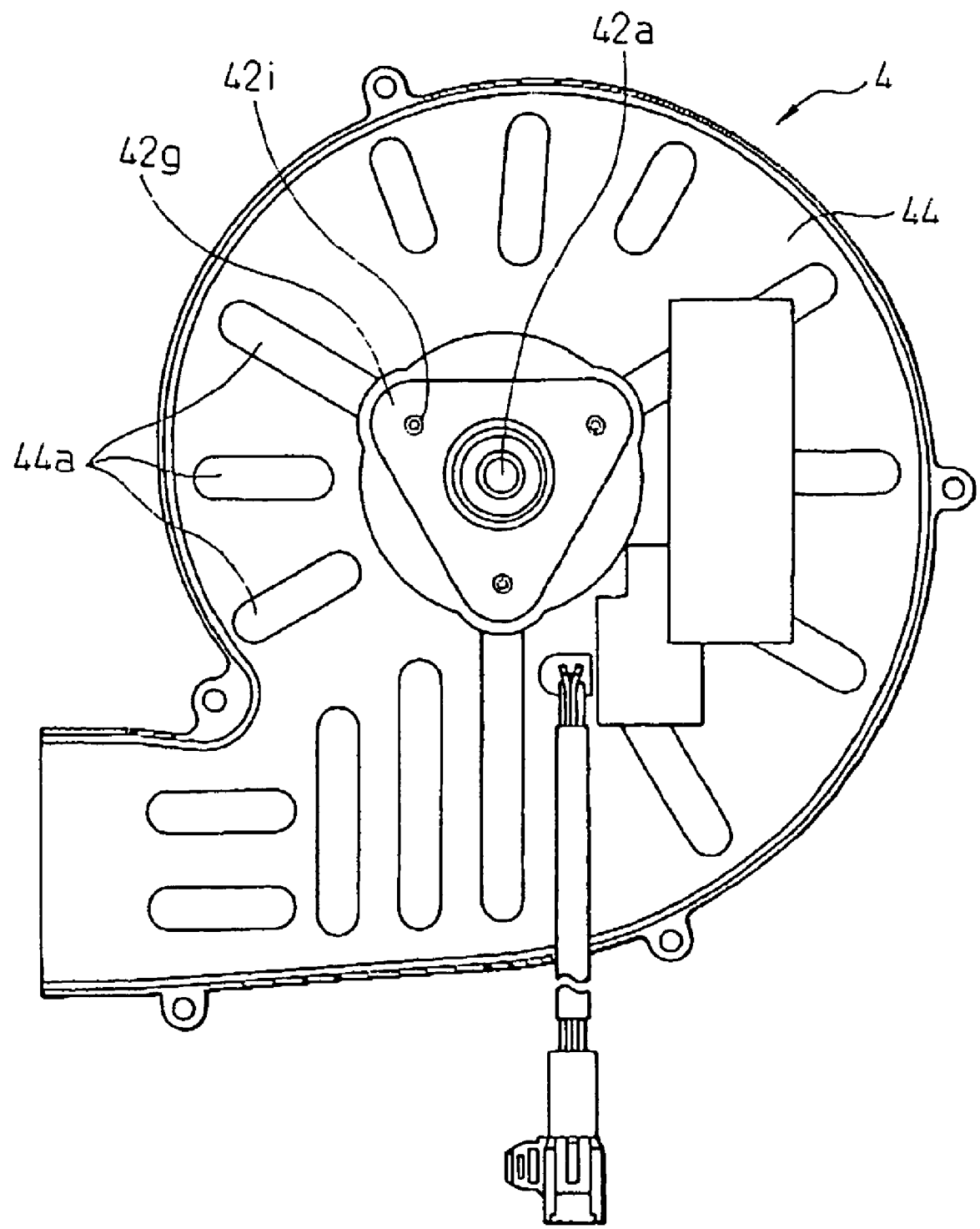
FIG. 4 is a bottom view of the blower shown in FIG. 2.

Referring to FIGS. 3 and 4, the motor support plate 44 will be explained in detail. FIG. 4 is a bottom view (a bottom view of FIG. 2) of the blower 4 of the present embodiment which is taken from a lower portion of the rotary shaft of the blowing fan 41. As shown in FIGS. 3 and 4, on the motor support plate 44, a plurality of bead-shaped protrusions 44a, which protrude onto the opposite side to the drive motor 42 attaching face, are provided.

As shown in FIG. 4, each protrusion 44a is formed into a substantial rectangle, the corners of which are chamfered. Some protrusions 44a are radially arranged round the rotary shaft of the blowing fan 41. Other protrusions 44a are arranged in the perpendicular and the horizontal direction with respect to the air current blown out from the air blowing port 43c. As shown in FIG. 3, a protrusion length E of the protrusion 44a is substantially the same as the thickness of the motor support plate 44.

In the present embodiment, when the protrusions 44a are provided, the resonance frequency (the natural frequency) of the motor support plate 44 is adjusted. The resonance frequency of the motor support plate 44 can be easily adjusted by adjusting the positions and the length E of the protrusions 44a. Accordingly, in the present embodiment, these protrusions 44a compose the resonance frequency adjusting portion for adjusting the resonance frequency of the support member.

Further, these protrusions 44a can be easily formed by means of press forming in which a protrusion die is pressed against a flat metallic plate. Accordingly, without greatly changing a design of the motor support plate 44 of the existing blower 4, the resonance frequency can be changed.

According to the investigations made by the present inventors, it was Previously found that the resonance frequency of the motor support plate 44 made of iron of the present embodiment can be easily set at a value not less than 1 kHz. Therefore, in the present embodiment, when the protrusions 44a are arranged as shown in FIGS. 3 and 4, the resonance frequency of the support member, which is formed out of the motor support plate 44 and the scroll casing 43, is adjusted to a value not less than 1 kHz. Accordingly, the predetermined frequency f of the present embodiment is 1 kHz.

Figure 5:
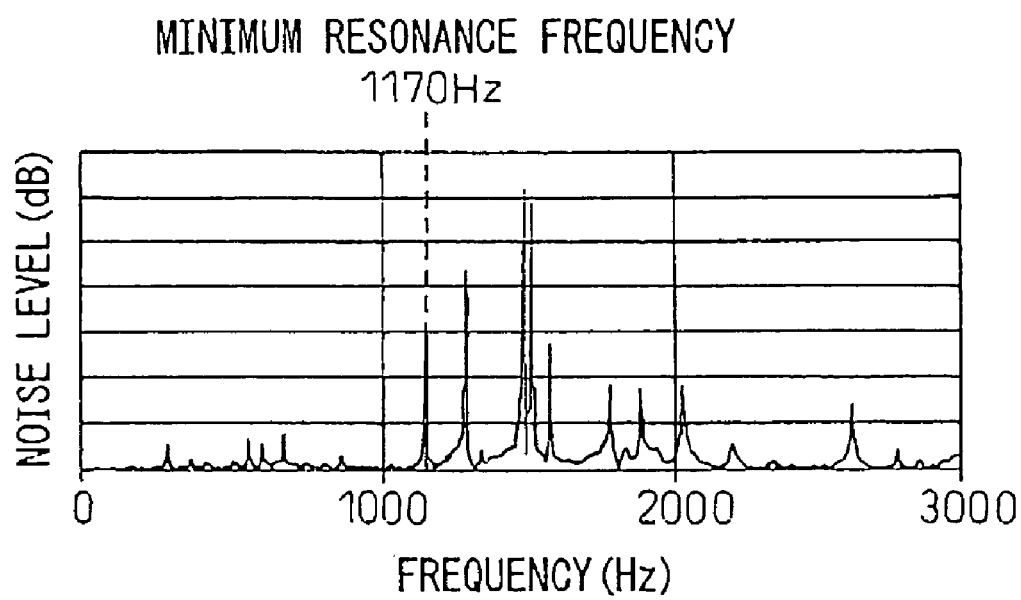
FIG. 5 is a graph showing a resonance frequency characteristic of a motor support plate of an embodiment.

In this case, the resonance frequency characteristic of the motor support plate 44 of the present embodiment will be explained referring to FIG. 5. FIG. 5 is a graph showing a noise level of each frequency generated by the motor support plate 44 in the case where an impact lead is given to the motor support plate 44 under the condition that an outer circumferential portion of the motor support plate 44 is fixed. FIG. 5 shows vibration frequencies in a so-called drum mode. As shown in FIG. 5, the minimum resonance frequency of the motor support plate 44 of the present embodiment is 1170 kHz.

As shown in FIG. 3, on the motor support plate 44, a vibration proof rubber attaching hole 44b is provided at a position fitted to the screw hole 42i of the drive motor 42. The vibration proof rubber 45 is fitted into this vibration proof rubber attaching hole 44b.

The vibration proof rubber 45 is used for damping the vibration generated by the drive motor 42. The vibration proof rubber 45 corresponds to the damping member described in the present embodiment. Further, the vibration proof rubber 45 is formed into an annular shape. Concerning the material of the vibration proof rubber 45, IIR (butyl rubber) is employed which is capable of satisfying the requirements of the spring characteristic and the rubber hardness for accomplishing a vibration proof action corresponding to the vibration characteristic (the frequency and amplitude) of the drive motor 42.

Figure 6:
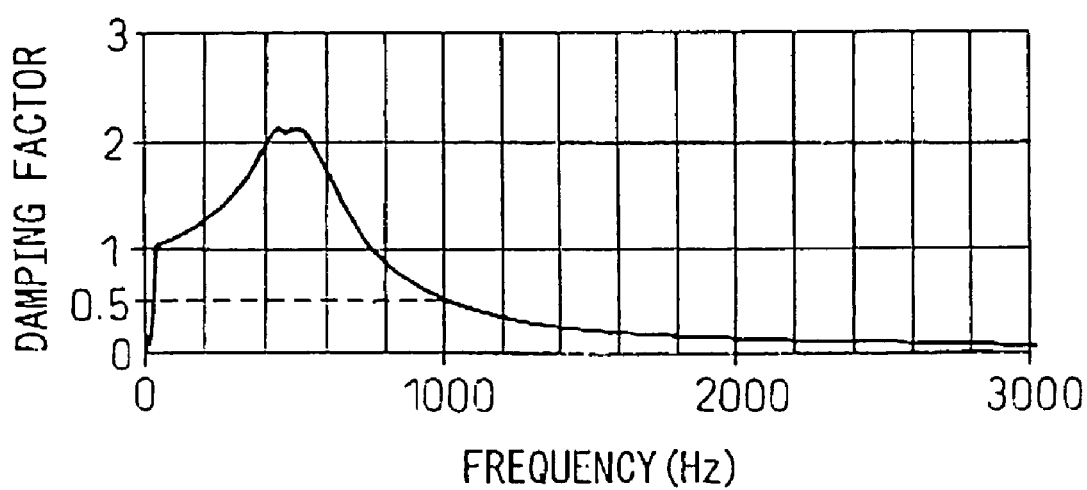
FIG. 6 is a graph showing a damping characteristic of vibration proof rubber of an embodiment.

Referring to FIG. 6, the damping characteristic of the vibration proof rubber 45 of the present embodiment will be explained below. FIG. 6 is a graph showing a change in the damping factor in the case where a frequency of the exciting force Pm given to the vibration proof rubber 45 is changed. The damping factor is defined as a ratio (Ps/Pm) of the exciting force Pm given to the vibration proof rubber 45 to the force Ps transmitted through the vibration proof rubber 45.

As shown in FIG. 6, in the case of the vibration proof rubber 45 of the present embodiment, the damping factor at the frequency not less than 1 kHz, which is the predetermined frequency f, is not more than 0.5. Accordingly, the vibration of the drive motor 42 itself, the frequency of which is not less than 1 kHz, is transmitted to the motor support plate 44 while it is being damped to a value not more than 50%.

In the present embodiment, the damping factor at the frequency of 1 kHz is set at 0.5 so that the generation of resonance noise can be effectively presented when the vibration of the drive motor 42, the frequency of which is not less than 1 kHz, is sufficiently damped. Of course, when the damping factor at the frequency of 1 kHz is further reduced, the vibration of the drive motor 42, the frequency of which is not less than 1 kHz, is seldom is transmitted to the motor support plate 44.

Figure 7:
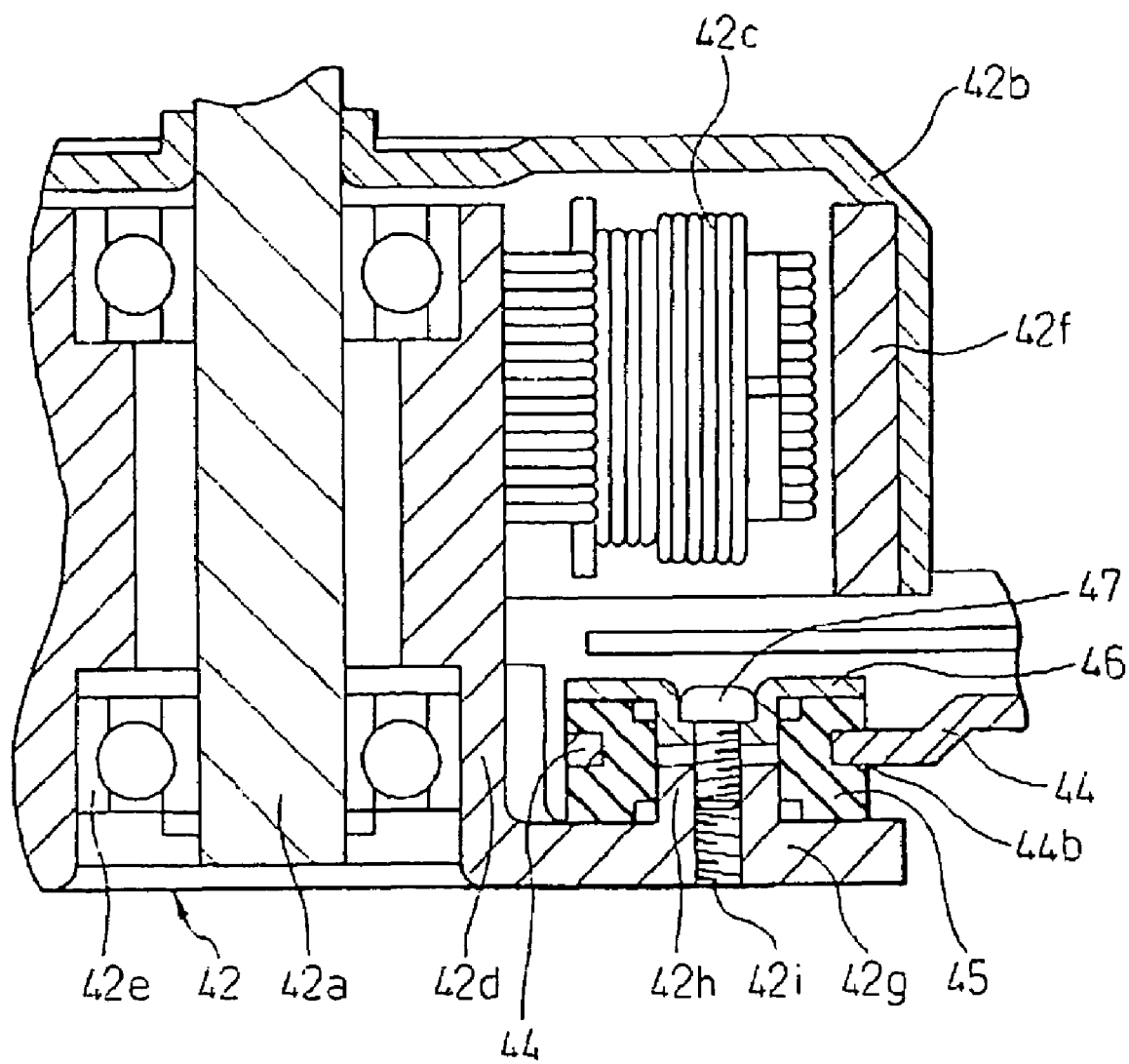
FIG. 7 is an enlarged sectional view of portion G of the blower shown in FIG. 3.

Next, explanations will be made into a motor support structure of the present embodiment in which the drive motor 42 is supported by the motor support plate 44. FIG. 7 is a view in which the portion G in FIG. 3 is enlarged. First, a boss portion 42h of the drive motor 42 is arranged at a position fitted to the vibration proof rubber attaching hole 44b of the motor support plate 44 from the opposite face side (the lower side of FIG. 6) to the attaching face of the drive motor 42 of the motor support plate 44. As described before, the vibration proof rubber 45 is fitted into the vibration proof rubber attaching hole 44b as described before.

From the blowing fan attaching face side (the upper side of FIG. 7) of the motor support plate 44, a screw 47 is screwed to the screw hole 42i of the drive motor 42 so that the screw 47 can penetrate the vibration proof rubber 45 through the attaching washer 46. After that, a stator coil 42c and the rotary shaft 42a, which is joined to a magnet rotor 42b, are attached to the motor body 42d.

When the drive motor 42 is supported by the motor support plate 42 as described above, the motor body 42d and the motor support plate 44 can be fixed and supported through the vibration proof rubber 45 without the motor body 42d making contact with the motor support plate 44.

Next, explanations will be made into an electric control sec-ion of the present embodiment. An electronic control unit 10 includes: a well known micro-computer having CPU, ROM, RAM and others; and a peripheral circuit. This electronic control unit 10 stores a cooling device control program in ROM. According to the cooling device control program, the electronic control unit 10 conducts various operations and processes.

As shown in FIG. 1, onto an input side of the electronic control unit 10, a battery temperature sensor, 11 for detecting a battery temperature Tb is connected. Onto an output side of an air conditioning control unit 30, a drive motor 42 for driving the blower 4 is connected. The action of the drive motor 42 is controlled by the control voltage V outputted from the electronic control unit 10.

Next, the operation of the present embodiment described above will be explained below. When a start switch of the vehicle engine, not shown, is turned on, the electronic control unit 10 executes a battery temperature control program stored in ROM.

According to this battery temperature control program, the electronic control unit 10 changes an output voltage V to be outputted to the drive motor 42 so that the battery temperature can be maintained to be not more than 43° C. Specifically, in the case where the battery temperature is not less than 40° C., the output voltage V outputted to the drive motor 42 is increased. In the case where the battery temperature is lower than $(40-\alpha)$ ° C., the output voltage V outputted to the drive motor 42 is decreased.

Due to the foregoing, the battery temperature is maintained to be not more than 43° C. and the battery life is extended. In this connection, the value $\alpha$ described above is a range of hysteresis for preventing the occurrence of hunting. In the present embodiment, the value $\alpha$ is set at 1° C. In the case where a lithium ion battery is employed for the battery 1 as described before, controlling may be conducted so that the battery temperature can be maintained at a temperature not more than 52° C.

In the present embodiment, the drive motor 42 is supported and fixed onto the motor support plate 44 through the vibration proof rubber 45 which damps vibration, the frequency of which is not less than 1 kHz, to be not more than 50%. Therefore, vibrational components generated by the drive motor itself, the frequency of which is not less than 1 kHz, are seldom transmitted to the support member composed of the motor support plate 44 and the scroll casing 43. Accordingly, the support member seldom resonates at a frequency not less than 1 kHz.

As described above, as the minimum resonance frequency of the support member is not less than 1 kHz, even when the vibration generated by the drive motor 42 itself, the frequency of which is lower than 1 kHz, is transmitted to the motor support plate 44, the support member does not resonate.

Accordingly, even when the vibration frequency of the drive motor 42 itself is changed in the case where the rotating speed of the drive motor 42 is changed for controlling the battery temperature, the support member does not resonate in all frequency bands. Therefore, the generation of resonance noise from the motor support plate 44 can be prevented.

OTHER EMBODIMENTS

It should be noted that the present invention is not limited to the above specific embodiment. Variations can be made as follows.

(1) In the embodiment described above, the vibration proof rubber 45 is employed as a damping member for damping the vibration generated from the drive motor 42. However, the other damping member may be used for damping.

Examples of the material of the vibration proof rubber 45 are: EPDM (ethylene propylene copolymer); natural rubber (NR); and synthetic rubber (CR). Alternatively, an air spring, metallic spring, plate spring and coil spring may be employed. Further, a damper device, wind leakage packing and urethane for absorbing vibration by utilizing viscous resistance and friction may be employed.

(2) In the embodiment described above, the resonance frequency of the support member is adjusted by providing the protrusions 44*a* on the motor support plate 44 composing the support member. However, the resonance frequency of the support member may be adjusted by providing the protrusions in the other components composing the supporting members.

For example, in the embodiment described above, the protrusions for adjusting the resonance frequency may be provided on the scroll casing 43. That is, when the protrusions are arranged at least in one of the components to which the vibration of the drive motor 42 is transmitted through the vibration proof rubber 45 of the damping member so as to adjust the resonance frequency of the support member, the same advantage as that of the embodiment described above can be provided.

(3) In the embodiment described above, in order to adjust the resonance frequency of the motor support plate 44, the protrusions 44*a* are formed on the motor support plate 44. However, the resonance frequency may be adjusted by adjusting the thickness of the motor support plate 44, or by changing the material of the motor support plate 44 or by adding a damping member to the motor support plate 44.

(4) In the embodiment described above, the generation of resonance noise is prevented when the resonance frequency of the support member is adjusted. Further the drive motor 42 and the blowing fan 41 may respectively have a resonance frequency adjusting section for adjusting the resonance frequency.

For example, when the resonance frequency adjusting section, which includes a protrusion, a thick portion and a material changing portion, is provided in the motor body 42*d* of the drive motor 42, the resonance frequency of the drive motor 42 is previously adjusted so that the resonance frequency of the motor 42 and the vibrational frequency of the drive motor 42 itself in the Operating state can not coincide with each other. Specifically, the resonance frequency may be adjusted at a value not less than the vibrational frequency generated at the time of the maximum output of the drive motor 42.

Due to the foregoing, even when a rotating speed of the drive motor 42 is changed and the vibrational frequency of the drive motor 42 itself is changed, the drive motor 42 does not resonate. Therefore, it is possible to prevent the generation of resonance noise of the drive motor 42.

In the same manner, for example, when the resonance frequency of the blowing fan 41 is adjusted by forming a resonance frequency adjusting section on a boss plate 41*b* of the blowing fan 41 composing the movable member, it is possible to prevent the generation of resonance noise of the movable member 41. That is, even when a rotating speed of the drive motor (42) is changed, the generation of resonance noise not only from the support member (43, 44) but also from the other components, to which vibration of the drive motor (42) itself is transmitted, can be prevented.

The resonance frequencies of the drive motor 42 and the movable member 41 may be adjusted not only by forming the resonance frequency adjusting section but also by changing the materials of the drive motor 42 and the blowing ran 41 and by changing the weight of them and by adding a damping member to them.

(5) In the above embodiment, the blower 4 of the present invention is applied to a battery cooling device incorporated into a hybrid vehicle. However, the blower 4 of the present invention may be applied to a battery cooling device for another type electric automobile, such as a fuel cell powered vehicle, on which a battery for supplying electric power for running is mounted.

Of course, an object to be cooled is not limited to a battery. The present invention can be widely applied to a cooling device for cooling an object to be cooled to a temperature not more than a predetermined temperature. The present invention may be applied not only to a cooling device but also to a device in which amount of sending air is changed by changing a rotating speed of the drive motor.

(6) In the above embodiment, the temperature sensor 11 for detecting the battery temperature Tb is employed However, this temperature sensor 11 may be arranged in one of the plurality of batteries 1 which indicates a representative temperature. Alternatively, this temperature sensor 11 may be arranged in each battery 1 and the average value may be used for controlling the electronic control unit 10.

(7) In the above embodiment, the present invention is applied to a blower, the rotating speed of the drive motor 42 of which is changed. However, the present invention may be applied to a blower, the rotating speed of the drive motor 42 of which is not changed, that is, the drive motor 42 o which is rotated at a constant speed.

In the blower of the present invention, even when the vibrational frequency of the drive motor 42 itself is changed in the entire range, resonance noise is not generated on the motor support plate 44. Therefore, even in the case of a blower, the drive motor 42 of which is rotated at a constant speed, the same effect can be provided.

While the invention has been described by reference to specific embodiments chosen for purposes of illustration, it should be apparent that numerous modifications could be made thereto, by those skilled in the art, without departing from the basic concept and scope of the invention.

The invention claimed is:

1. A motor driven blower comprising:
   a blowing fan;
   a support member including a scroll casing made of resin and a motor support plate made of a metallic plate, the scroll casing and the motor support plate being arranged to define a spiral air passage in which the blowing fan is accommodated;
   a drive motor including a stator, a rotor which rotates a rotary shaft engaged with the blowing fan, and a motor body on which the rotary shaft is supported through a bearing, the motor body including a flange formed on the motor body extending along an outside of the motor support plate; and
   a plurality of supports arranged around the motor body, each of the supports including a vibration proof rubber attaching hole formed on the motor support plate, a vibration proof rubber fitted in the vibration proof rubber attaching hole, and an engaging member engaging the flange onto the vibration proof rubber so that the drive motor is supported on the motor support plate via the vibration proof rubber, wherein
   the drive motor generates a vibration including frequency components not less than 1 KHz, the vibration proof rubber has a damping characteristic showing a damping factor not more than 0.5 at 1 kHz and less damping factor in a frequency region higher than 1 kHz, and the motor support plate further including a resonance frequency adjustment section formed around the drive motor supported thereon, the resonance frequency adjustment section is formed with a plurality of bead-shaped protruding portions on a surface thereof in order to adjust a resonance frequency of the motor support plate in a drum mode to not less than 1 kHz.

2. The motor driven blower according to claim 1, wherein the vibration proof rubber is made of butyl rubber.

3. The motor driven blower according to claim 1, wherein the drive motor further includes a resonance frequency adjustment section for adjusting a resonance frequency of the drive motor.

4. The motor driven blower according to claim 1, wherein the bead-shaped protruding portions are radially arranged on the motor support plate.

* * * * *